(12) United States Patent
Fourie

(10) Patent No.: US 6,502,451 B1
(45) Date of Patent: Jan. 7, 2003

(54) LEAKAGE DETECTOR, A LATCHING SOLENOID, A FLOW METER, AND A LIQUID DISPENSING APPARATUS INCLUDING SAME

(76) Inventor: Eugene Fourie, 57 Herbert Baker Street, Groenkloof, Pretoria 0181 (ZA)

( * ) Notice: Subject to any disclaimer, the term of this patent is extended or adjusted under 35 U.S.C. 154(b) by 0 days.

(21) Appl. No.: 09/674,240

(22) PCT Filed: Apr. 29, 1999

(86) PCT No.: PCT/ZA99/00027

§ 371 (c)(1),
(2), (4) Date: Oct. 27, 2000

(87) PCT Pub. No.: WO99/56101

PCT Pub. Date: Nov. 4, 1999

(30) Foreign Application Priority Data

Apr. 30, 1998 (ZA) .............................................. 98/3677

(51) Int. Cl.[7] .................................................. G01M 3/08
(52) U.S. Cl. ..................................... 73/40.5 R; 222/59
(58) Field of Search ............................. 73/40.5 R, 262, 73/269, 270, 271, 278, 279, 861.79; 200/83 L

(56) References Cited

U.S. PATENT DOCUMENTS

| | | | | |
|---|---|---|---|---|
| 47,866 A | * | 5/1865 | Sheffield | 73/861.79 |
| 2,444,163 A | * | 6/1948 | Kocmich | 200/83 |
| 3,811,323 A | * | 5/1974 | Swenson | 73/861.83 |
| 3,898,403 A | * | 8/1975 | Grayson et al. | 200/83 Q |
| 4,283,706 A | * | 8/1981 | Kimura et al. | 340/445 |
| 4,357,748 A | * | 11/1982 | Branson et al. | 29/622 |
| 4,489,616 A | * | 12/1984 | Priddy | 73/861.79 |
| 4,914,372 A | * | 4/1990 | Ishida | 320/61 |
| 5,056,554 A | * | 10/1991 | White | 137/486 |
| 5,337,615 A | * | 8/1994 | Goss | 73/861.33 |
| 5,811,908 A | * | 9/1998 | Iwata et al. | 310/261 |
| 5,907,992 A | * | 6/1999 | Huss | 92/103 F |
| 6,056,008 A | * | 5/2000 | Adams et al. | 137/487.5 |

FOREIGN PATENT DOCUMENTS

DE          30 00 801          7/1981

OTHER PUBLICATIONS

Japanese Patent Abstract, Document No. JP8210599A2.
Japanese Patent Abstract, Document No. JP2017275A2.

* cited by examiner

*Primary Examiner*—Hezron Williams
*Assistant Examiner*—Charles D. Garber
(74) *Attorney, Agent, or Firm*—Akerman Senterfitt

(57) ABSTRACT

This invention relates to the dispensing of liquids by means of a fluid dispensing apparatus (10) having one or more of a leakage detection means (94), a latching solenoid (84), and a fluid flow meter (20). The invention also provides each of the leakage detection means, the latching solenoid, then fluid flow meter, a fluid dispensing installation, and a method of dispensing fluid. In some embodiments, the fluid dispensing apparatus is a pre-payment water dispensing meter.

12 Claims, 8 Drawing Sheets

LEAKAGE DETECTOR, A LATCHING SOLENOID, A FLOW METER, AND A LIQUID DISPENSING APPARATUS INCLUDING SAME

This Invention relates to the dispensing of liquids. More particularly it relates to liquid dispensing apparatus and to a liquid dispensing installation. It also relates to a method of dispensing a liquid.

The inventor is aware of a need for fluid dispensing apparatus which can be used for pre-paid water distribution systems, but which will respond to fluid leakage from a system to which it is installed, will reduce unmeasurably low flows passing being dispensed, and operate for longer periods of time without the need for maintenance, in particular battery replacement.

According to one aspect of the invention there is provided liquid dispensing apparatus which includes
- a housing;
- an inlet port leading into the housing;
- an outer port leading from the housing;
- flow path defining means within the housing defining a flow patch connecting the inlet and outer ports in flow communication; and
- valve means intermediate the inlet and the outer port and displaceable between an open position and a closed position to regulate the flow of liquid through the flow path, the inlet and outlet ports being spaced apart and parallel.

Typically the inlet and outlet ports open out of a rear surface of the housing.

According to another aspect of the invention there is provided liquid dispensing apparatus which includes
- a housing defining a flow path, an inlet port at one end of the flow path and an outlet port at the other end of the flow path;
- valve means contained within the housing for regulating the flow of liquid through the flow path; and
- a processor contained within the housing for controlling the operation of the valve means.

The housing may be formed from three parts, each of which is moulded of a synthetic plastics material, two of the parts together defining the flow path.

According to another aspect of the invention there is provided liquid dispensing apparatus which includes
- a housing;
- an inlet port leading into the housing;
- an outlet port leading from the housing;
- flow path defining means defining a flow path connecting the inlet and outlet ports in flow communication;
- valve means intermediate the inlet and the outlet ports and displaceable between an open position and a closed position to regulate the flow of liquid through the flow path; and
- a flow meter for measuring the volumetric flow of liquid through the flow path, the flow meter including a rotor mounted for rotation in the flow path and linked magnetically to a counter.

According to yet another aspect of the invention there is provided liquid dispensing apparatus which includes
- a housing;
- an inlet port leading into the housing;
- an outlet port leading from the housing;
- flow path defining means defining a flow path connecting the inlet port and outlet port in flow communication;
- valve means intermediate the inlet port and the outlet port and displaceable between an open position and a closed position to regulate the flow of liquid through the flow path; and
- a flow meter for measuring the volumetric flow of liquid through the flow path, the flow meter including a stator mounted in the flow path and configured to impart an angular direction of flow to liquid passing therethrough, a rotor mounted for rotation in the flow path immediately downstream of the stator, the rotor including a hub and a plurality of circumferentially spaced apart radially extending arms and axially extending vanes protruding from the arms.

The hub may be generally frusto-conical in shape and taper away from the stator, i.e. in the downstream direction.

The flow meter may include a magnet mounted on the rotor and a counter configured to count magnetic pulses which correspond to the revolutions of the rotor and hence the liquid flow rate.

According to still another aspect of the invention there is provided a liquid dispensing apparatus which includes
- a housing;
- an inlet port leading into the housing;
- an outlet port leading from the housing;
- flow path defining means within the housing defining a flow path connecting the inlet and outlet ports in flow communication;
- valve means intermediate the inlet and the outlet port and displaceable between an open position and a closed position to regulate the flow of liquid through the flow path,
- a processor for controlling the operation of the valve means; and
- leakage detection means designed to detect flow below a predetermined level and linked to the processor so that the valve means is closed should a flow below a predetermined level be detected.

The inlet and outlet ports may be parallel and open out of a rear surface of the housing.

The housing may include a front surface which is parallel with the rear surface, and at least one hole extending through the housing from the front surface to the rear surface through which a shank of a fastener can pass, the hole being spaced from and extending parallel to the inlet and outlet ports. Preferably, at least two parallel spaced apart holes extend through the housing. The or each hole may be countersunk to receive a head of the associated fastener. The apparatus may include a tamper indicating cap or plug receivable in each of the holes to inhibit access to the fasteners. Alternatively, the apparatus may include a tamper indicating cap having a number of plugs receivable in at least some of the holes to inhibit access to the fasteners.

The liquid dispensing apparatus may include a reader configured to read information stored on payment means in the form of an electronic data storage device and linked to the processor thereby permitting the apparatus to function as a pre-payment meter.

The electronic data storage device may be in the form of a chip card, a magnetic data carrier, or the like.

The apparatus typically includes an electrical power source, e.g. in the form of a battery. However, the electrical power source may be an electrical supply circuit connection, a water powered electricity generating dynamo, all the like.

The valve means may be in the form of a diaphragm valve. In particular, the valve means may be a latching valve.

The housing may be about the size of a conventional brick so that it is readily mountable in a wall.

According to yet another aspect of the invention there is provided a liquid dispensing installation which includes an inlet pipe connected to a pressurised supply of liquid;

an outlet pipe;

liquid dispensing apparatus which includes a housing;

an inlet port leading into the housing;

an outlet port leading from the housing;

flow path defining means defining a flow path which connects the inlet port and the outlet port in flow communication; and valve means for regulating the flow of liquid through the flow path, the inlet pipe and inlet port and the outlet pipe and outlet port being provided with complementary formations which are slidably engageable to provide a fluid tight connection between a downstream end of the inlet pipe and the inlet port and between an upstream end of the outlet pipe and the outlet port.

Preferably, male formations are provided on the inlet pipe and the outlet pipe which formations are receivable in a liquid tight manner in the inlet port and outlet port, respectively, male/female fashion.

Each of the male formations may have an annular seal on its outer surface.

The inlet and outlet pipes may be embedded in or extend through a wall, the desired spacing of the male formations, which are typically recessed into the wall, being determined by a spacer plate through apertures in which the male formations protrude, the housing being retained in position by means of at least one and preferably two fasteners which extend through holes in the housing into engagement with the spacer plate.

A normally closed shut-off valve may be mounted in the inlet pipe, the valve including a closure member which is urged to a closed position, a closure member engaging formation being mounted in the liquid dispensing apparatus such that when the male formation of the inlet pipe is inserted into the inlet port the closure member engaging formation engages the closure member and displaces it away from its closed position to permit the flow of liquid from the inlet pipe into the flow path and when the inlet pipe is removed from the inlet port the closure member is permitted to return to its closed position thereby cutting off the flow of liquid.

A filter may be mounted in the inlet pipe upstream of the shut-off valve.

The liquid dispensing apparatus may include a reader for reading information on a storage device and a processor linked to the reader and, configured to control the operation of the valve means and hence the dispensing of liquid. The reader may include an electrical contact arrangement against which a storage device, including an electrical circuit configured complementarily to the electrical contact arrangement, may be located in electrical communication therewith for reading, for example, a microprocessor and associated reader.

The installation may include a remote data access point through which access can be gained to data stored in the processor. The access point will typically be positioned outside the wall thereby permitting access thereto by the authorities, e.g. a water bailiff.

The apparatus will typically be liquid dispensing apparatus of the type described above.

According to still yet another aspect of the invention there is provided a method of dispensing a liquid making use of apparatus which includes a flow line, valve means for regulating the flow of liquid through the flow line, processor means for receiving data from a pre-payment token and for regulating operation of the valve means, which method includes the step of signalling to a person that his credit is almost exhausted by operating the valve means to pulse the flow of liquid being dispensed.

According to still a further aspect of the invention there is provided a method of dispensing liquid making use of the apparatus which includes a flow line, valve means for regulating the flow of liquid through the flow line, processor means for receiving data from a pre-payment token and for regulating the operation of the valve means which method includes the steps of sensing the rate of liquid flow and if the flow rate remains below a predetermined level for a predetermined period of time closing the valve means to interrupt the flow of liquid.

According to still another aspect of the invention there is provided a liquid dispensing apparatus which includes a housing;

inlet port leading into the housing;

an outlet port leading from the housing;

flow path defining means within the housing defining a flow path connecting the inlet and outlet ports in flow communication;

first valve means intermediate the inlet and the outlet port and displaceable between an open position and a closed position to regulate the flow of liquid through the flow path;

a processor for controlling the operation of the first valve means;

a reader configured to read information stored on payment means in the form of an electronic data storage device and linked to the processor thereby permitting the apparatus to function as a meter or a pre-payment meter; and second valve means intermediate the inlet and the outlet port and displaceable between an open position and a closed position to regulate the flow of liquid through the flow path, the second valve means having an actuating handle receiving portion shaped and dimensioned to receive a removable actuating handle.

The second valve means may be configured such that the removable actuating handle is only removable from said receiving portion when the valve is in the closed position, typically in a standpipe type installation.

However, the second valve means may be configured such that the removable actuating handle is only removable from said receiving portion when the valve is in the open position, typically in a yard type installation.

The second valve means have one or more parts in common with the first valve means. Typically, the second valve means uses the same diaphragm as the first valve means.

The second valve means removable actuating handle may include the payment means.

Typically, the removable actuating handle may be in the form of a bar having an actuating handle receiving portion engaging formation. The engaging formation may be the electronic data storage device of the payment means.

In one embodiment, the removable actuating handle is in the form of a Dallas tag having a magnetic data carrier provided thereon, and the actuating handle receiving portion of the second valve means is in the form of a recess sized and dimensioned to snugly receive said handle therein for actuation of the second valve means. In this embodiment the housing may have a slot provided therein to permit the insertion and withdrawal of the removable actuation handle into and from the housing.

The liquid dispensing apparatus may include leakage detection means designed to detect flow below a predetermined level and linked to the processor so that the first valve means is closed should a flow below a predetermined level be detected.

According to still a further aspect of the invention there is provided a method of dispensing liquid making use of the apparatus which includes a flow line, valve means for regulating the flow of liquid through the flow line, processor means including reader means for receiving data from a pre-payment token and for regulating the operation of the valve means, and a pre-payment token, which method includes the steps of:

bringing said pre-payment token into data transfer communication with the reader means;

reading the pre-payment token into the processor; and if the pre-payment token is not valid for dispensing the fluid, operating the valve means from the processor to prevent the fluid from being dispensed.

The last three steps of the above method may be performed in any order or simultaneously.

By "not valid" in relation to the pre-payment means is meant that the pre-payment means has expired, is faulty, has been reported missing, or the like.

According to still a further aspect of the invention there is provided a method of dispensing liquid making use of the apparatus which includes a flow line, first valve means for regulating the flow of liquid through the flow line, processor means including reader means for receiving data from a pre-payment token and for regulating the operation of the first valve means, second valve means for regulating the flow of liquid through the flow line, and a removable second valve actuating handle including a pre-payment token, which method includes the steps of:

bringing said removable handle into abutment with the second valve means and data transfer communication with the reader means;

actuating the second valve means by use of said removable handle;

reading the pre-payment token into the processor; and if the pre-payment token is valid for dispensing the fluid, operating the first valve means from the processor to permit the pre-paid amount of fluid to be dispensed.

The last three steps of the above method may be performed in any order or simultaneously.

According to yet another aspect of the invention, there is a leakage detection means for a liquid dispensing apparatus as described above, the leakage detection means including:

a diaphragm locatable radially to a direction of flow of liquid through the liquid dispensing apparatus;

a magnet provided on the diaphragm and displaceable by the diaphragm in sympathy with fluctuations in pressure exerted on the diaphragm; and a detection switch actuatable by proximity to the magnet located on the liquid dispensing apparatus for detecting displacement of the magnet towards the detection switch.

Typically, the detection switch is a reed switch of the type having a ferritic reed, the switch being actuatable by the ferritic reed as the magnet provided on the diaphragm is displaced towards it.

The material of manufacture of the diaphragm is carefully selected to be flexible such that deformation of the diaphragm, and thus displacement of the magnet provided on the diaphragm, will occur in response to a pressure fluctuation which is indicative of a leakage condition.

Typically, the diaphragm is made of a polymeric material, whether natural or synthetic, having a hardness rating of between 50 and 70 on the Shore A scale, generally about 60. The thickness of the diaphragm may be between 0.2 mm and 1.5 mm, typically between 0.3 mm, and 1 mm thick about the zone of inflection of the diaphragm.

Materials suitable for manufacture of the diaphragm include both synthetic and natural nitrile rubber, and Neoprene™.

According to yet a further aspect of the invention there is provided a fluid flow meter, the flow meter including:

a stator mounted in the flow path and configured to impart an angular direction of flow to liquid passing therethrough, a rotor mounted for rotation in the flow path immediately downstream of the stator, the rotor including a hub and a plurality of circumferentially spaced apart radially extending arms and axially extending vanes protruding from the arms.

The invention extends to a fluid flow meter including a rotor made of a material having substantially the same density as the fluid, the flow of which is to be measured by the fluid flow meter.

The rotor may be made of H.D.P.E. The use of a rotor made from a material having a similar density as the fluid, the flow of which is to be measured by the fluid flow meter is that rotor balance and strength problems are less likely to arise.

The rotor may be mounted with the vanes extending away from the stator.

The hub may be generally frusto-conical in shape and taper away from the stator, i.e. in the downstream direction.

The vanes may be shaped and dimensioned to optimise hydraulic drag.

The hub may be hollow to reduce the inertia of the rotor.

The flow meter may include a magnet mounted on the rotor and a counter configured to count magnetic pulses which correspond to the revolutions of the rotor and hence the liquid flow rate.

The magnet and counter may be in the form of a magnet and reed switch arrangement, the magnet being mounted on a displaceable portion of the rotor and the counter is a reed switch of the type having a ferritic reed, the switch being actuatable by the ferritic reed as the magnet provided on the rotor is displaced towards and passes in proximity of the ferritic reed during rotation of the rotor.

A counter balance weight may be provided on the rotor to ensure rotational balance of the rotor.

Typically, the counter balance weight is located on the hub at a position diametrically opposed the location of the magnet.

Where the fluid flow meter is housed between two surfaces, for example, in a box, the invention extends further to a method of installing a rotor into the fluid flow meter to obtain the correct axial bearing play, the method including:

deflecting under a predetermined load the surface to which one of the bearings is fitted i.e. the top or the bottom bearing;

urging the end of the rotor, and its associated bearing, which are remote the deflected surface, into position; and maintaining a residual deflecting load to maintain the bearings with the correct degree of axial play.

According to a final aspect of the invention, there is provided a latching solenoid valve arrangement for use in polluted and/or corrosive environments, the latching solenoid valve including:
  a body defining a fluid flow path therethrough between an inlet port and an outlet port:
  a valve seat located in the flow path between the inlet port and the outlet port:
  a housing in the form of a receptacle, and housed inside the housing:
    one or more electromagnet;
    a displaceable shaft made of a material capable of being drawn towards the electromagnet when the electromagnet is energised;
    a corrosion inhibiting fluid bathing the one or electromagnet and the shaft; and
  a resiliently deformable diaphragm attached at one end of the shaft and configured to seal the housing, the diaphragm being urgable by the displaceable shaft under the action of the one or more electromagnet, to seat sealingly against the valve seat, to inhibit flow through the flow path between the inlet port and the outlet port, the diaphragm further being configured to bias the shaft into the housing.

The one or more electromagnet may be arranged to provide a guide channel or gap within which the shaft may be guided during displacement between a first position, in which the diaphragm is urged to seat sealingly against the valve seat, and a second position, in which flow is permitted in the flow path between the inlet port and the outlet port, the electromagnet being selected to maintain sufficient residual magnetism to maintain the shaft in substantially its last actuated position, i.e. in the vicinity of the first or the second position, until the electromagnet is energised in the opposite direction by means of either switching the polarity of the energising current or by energising a second electromagnet having windings of opposite direction to the first electromagnet. The bias of the diaphragm on the shaft assists the electromagnet in the urging of the shaft between the first and second positions.

The electromagnet may be in the form of a solenoid including an iron containing core having electricity conducting wire wound around said core.

The housing may be part of the housing of a fluid dispensing apparatus, substantially as described above.

The shaft may be made of mild steel, or any other sufficiently rigid, magnetically attractable material, which is economically viable to use. The shaft may be coated with a friction reducing composition and/or a corrosion reducing composition.

The corrosion inhibiting fluid may be water, whether ordinary mains water or purified, distilled and/or de-ionised water, to which a corrosion inhibiting substance, selected to be inhibit corrosion of the shaft, the core and windings, has been added. Typically said fluid is non-toxic to humans at the quantities found in the housing.

The diaphragm may be made of any suitable water impervious, resiliently deformable material.

Typically, the diaphragm is made of a polymeric material, whether natural or synthetic, having a hardness rating of between 50 and 70 on the Shore A scale, generally about 60. The thickness of the diaphragm may be between 0.2 mm and 1.5 mm, typically between 0.3 mm and 1 mm thick about the zone of inflection of the diaphragm.

Materials suitable for manufacture of the diaphragm include both synthetic and natural nitrile rubber, and Neoprene™.

In one embodiment, the diaphragm of the latching valve is made unitary (from a single piece of material) with the diaphragm of the leakage detection means described above.

The diaphragm of the latching valve may be used for leakage detection, as described for the leakage detection means above, thereby removing the need for a separate leakage detection means.

The invention will now be described, by way of example, with reference to the accompanying diagrammatic drawings.

Figure 2:
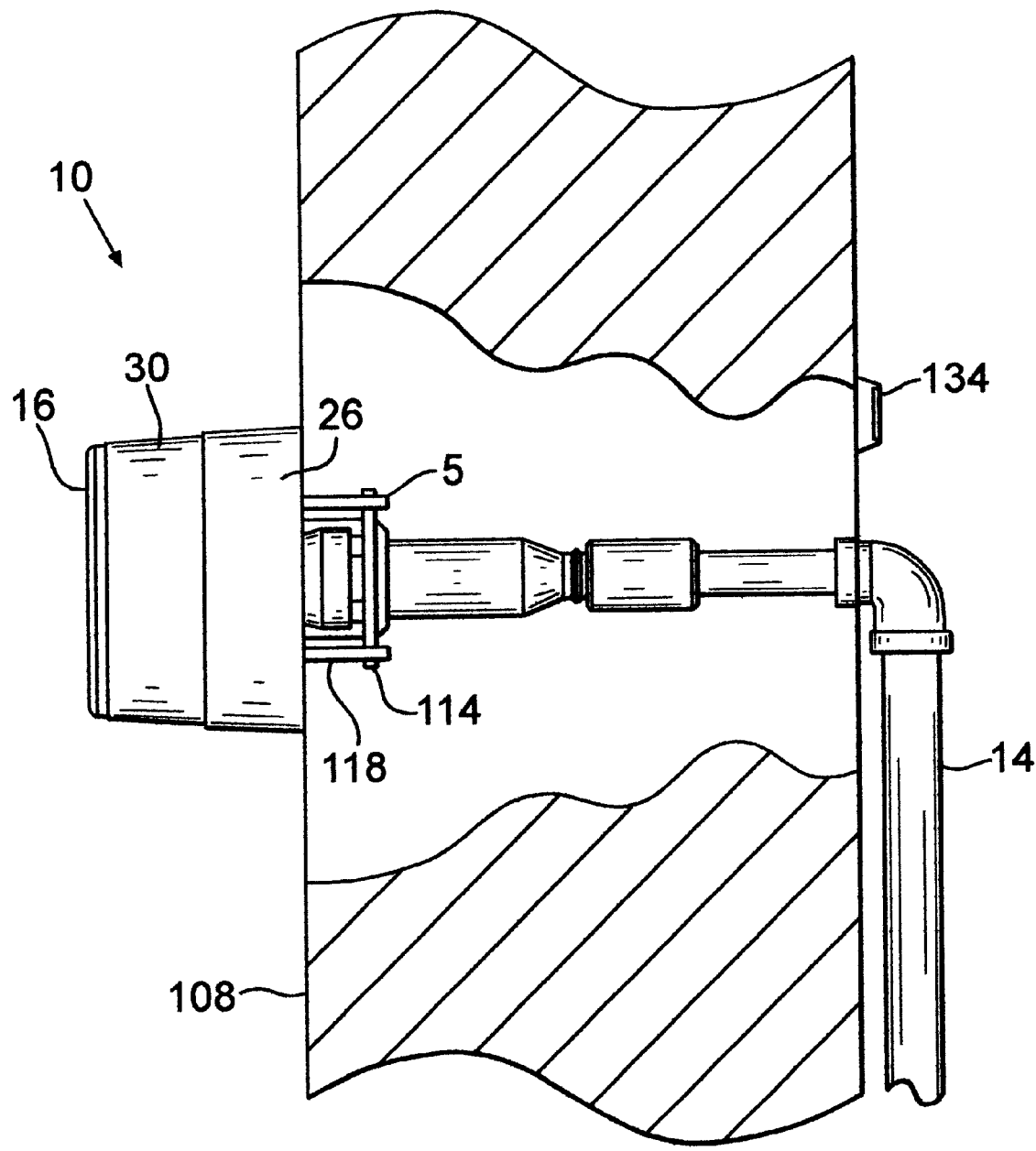
FIG. 2 shows a sectional view of a liquid dispensing installation incorporating the apparatus of FIG. 1.
Figure 3:
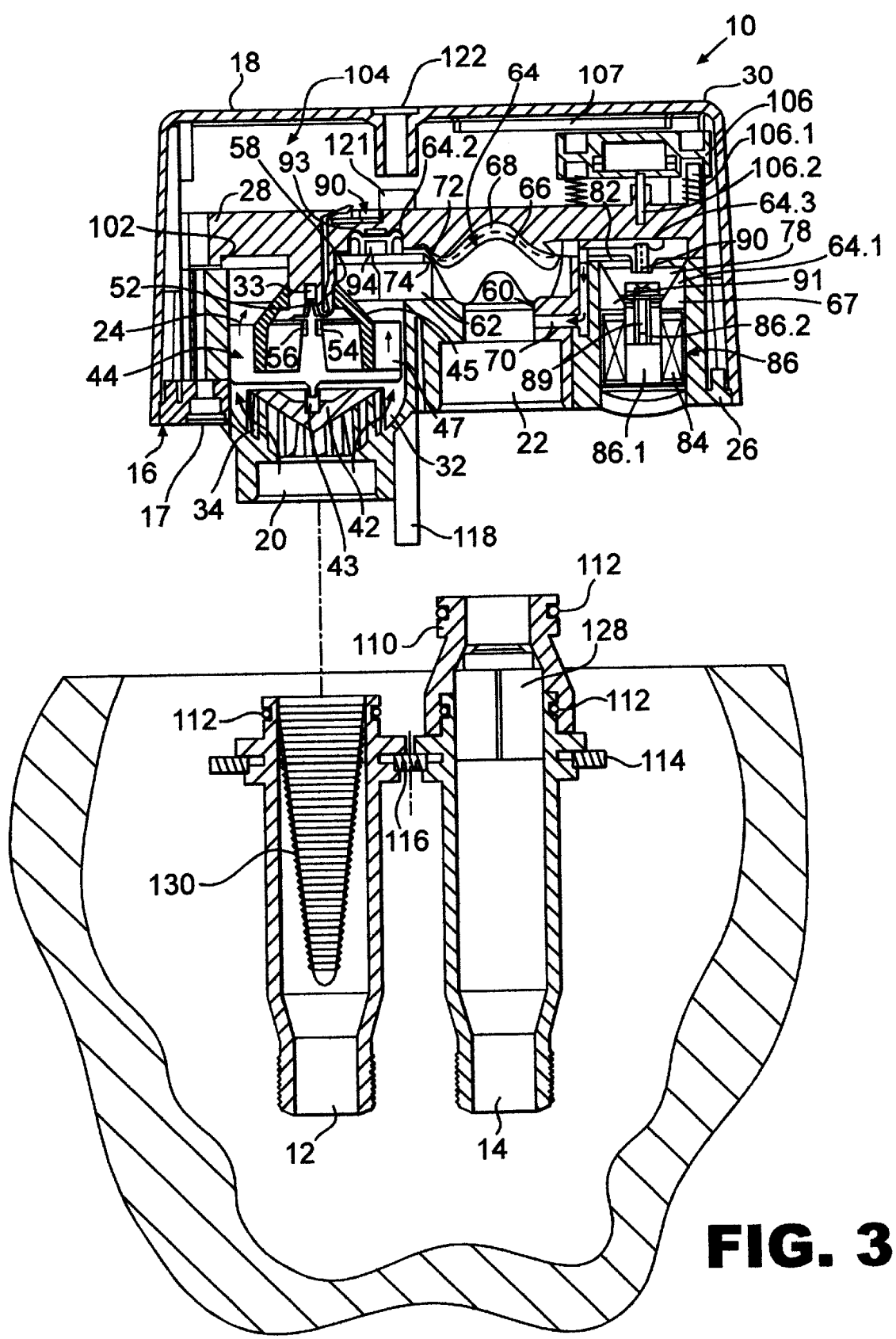
FIG. 3 shows an exploded sectional elevation of the installation of FIG. 2.

In FIGS. 2 and 3 of the drawings, reference numeral 10 refers generally to a liquid dispensing installation in accordance with the invention. The installation 10 includes an inlet pipe 12 connected to a supply of pressurised liquid, typically water, an outlet pipe 14 and liquid dispensing apparatus, generally indicated by reference numeral 16 connected in flow communication with the inlet pipe 12 and outlet pipe 14, as described in more detail herebelow.

Figure 4:
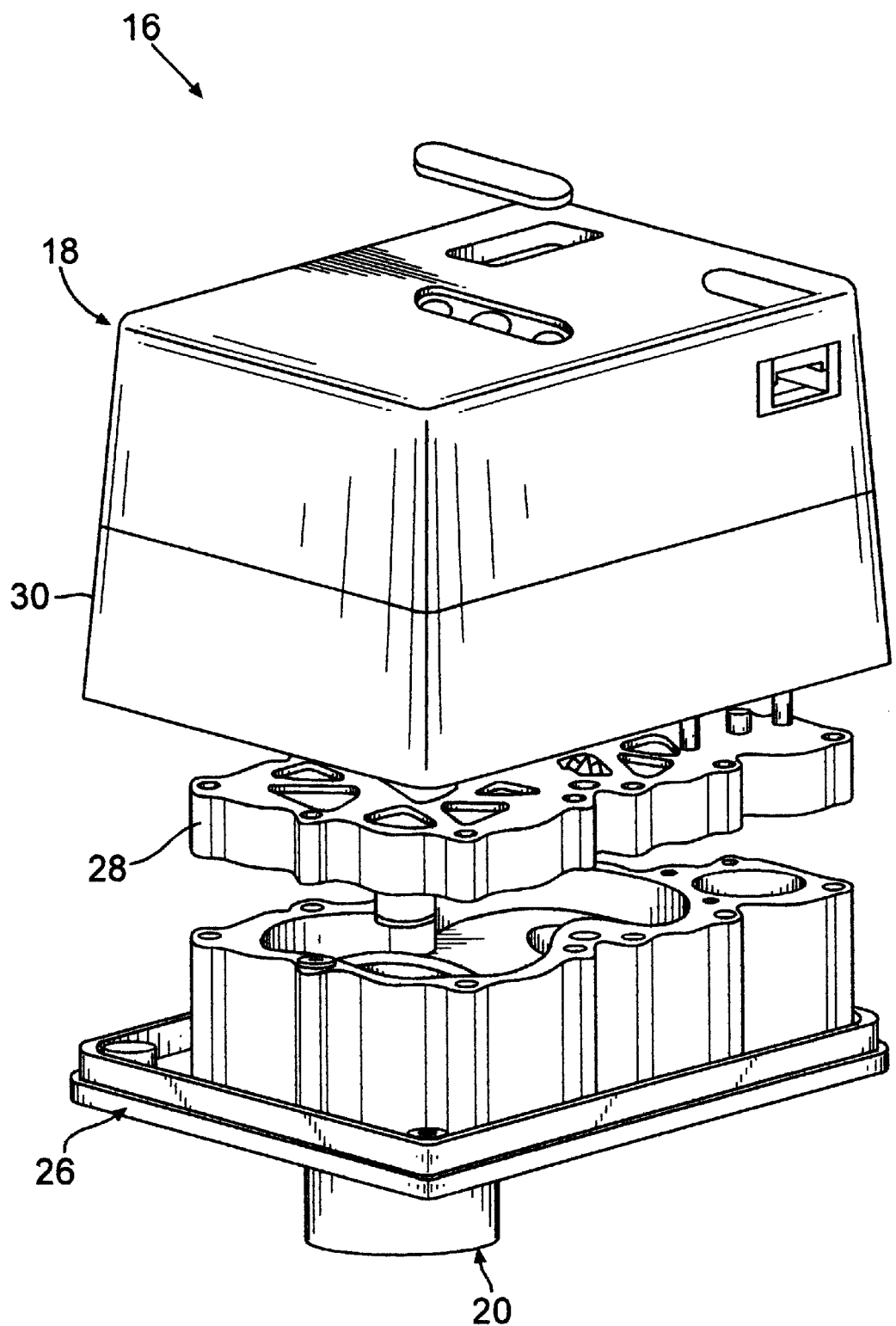
FIG. 4 shows a three-dimensional exploded view of the liquid dispensing apparatus of FIG. 1.
Figure 5:
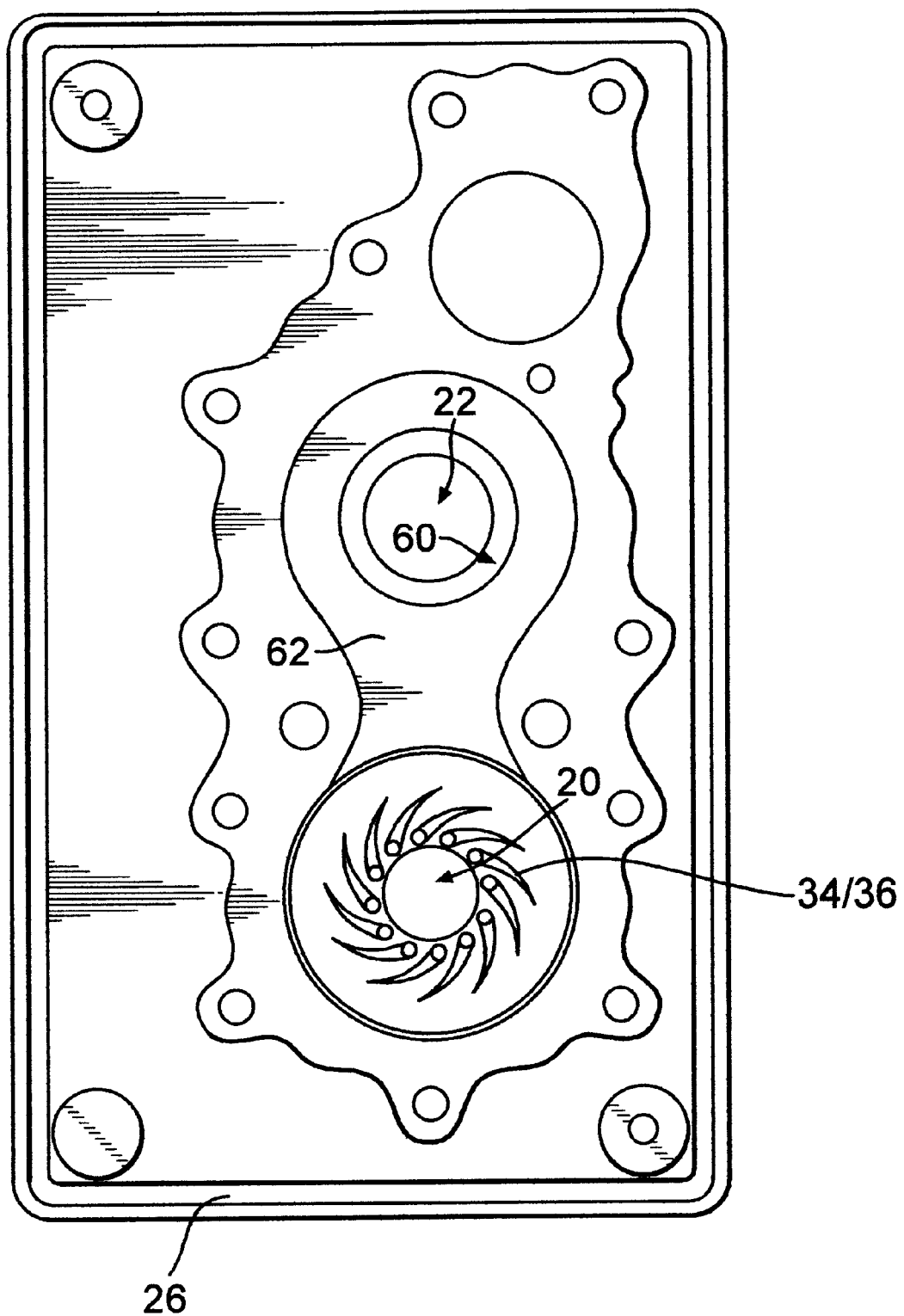
FIG. 5 shows a plan view of a lower part of a housing of the apparatus of FIG. 1.

Referring now also to FIGS. 4 and 5 of the drawings, the liquid dispensing apparatus includes a housing, generally indicated by reference numeral 18, an inlet port 20 leading into the housing, an outlet port 22 leading from the housing, and flow path defining means defining a flow path 24 (see FIG. 3) connecting the inlet port 20 and outlet port 22 in flow communication.

As can best be seen in FIG. 4 of the drawings, the housing 18 comprises a lower part 26, an intermediate part 28 and a top part 30, each of which is moulded of a synthetic plastics material.

The inlet port 20 is circular cylindrical in shape and opens into a first chamber 32 in which is mounted a stator 34.

Figure 6:
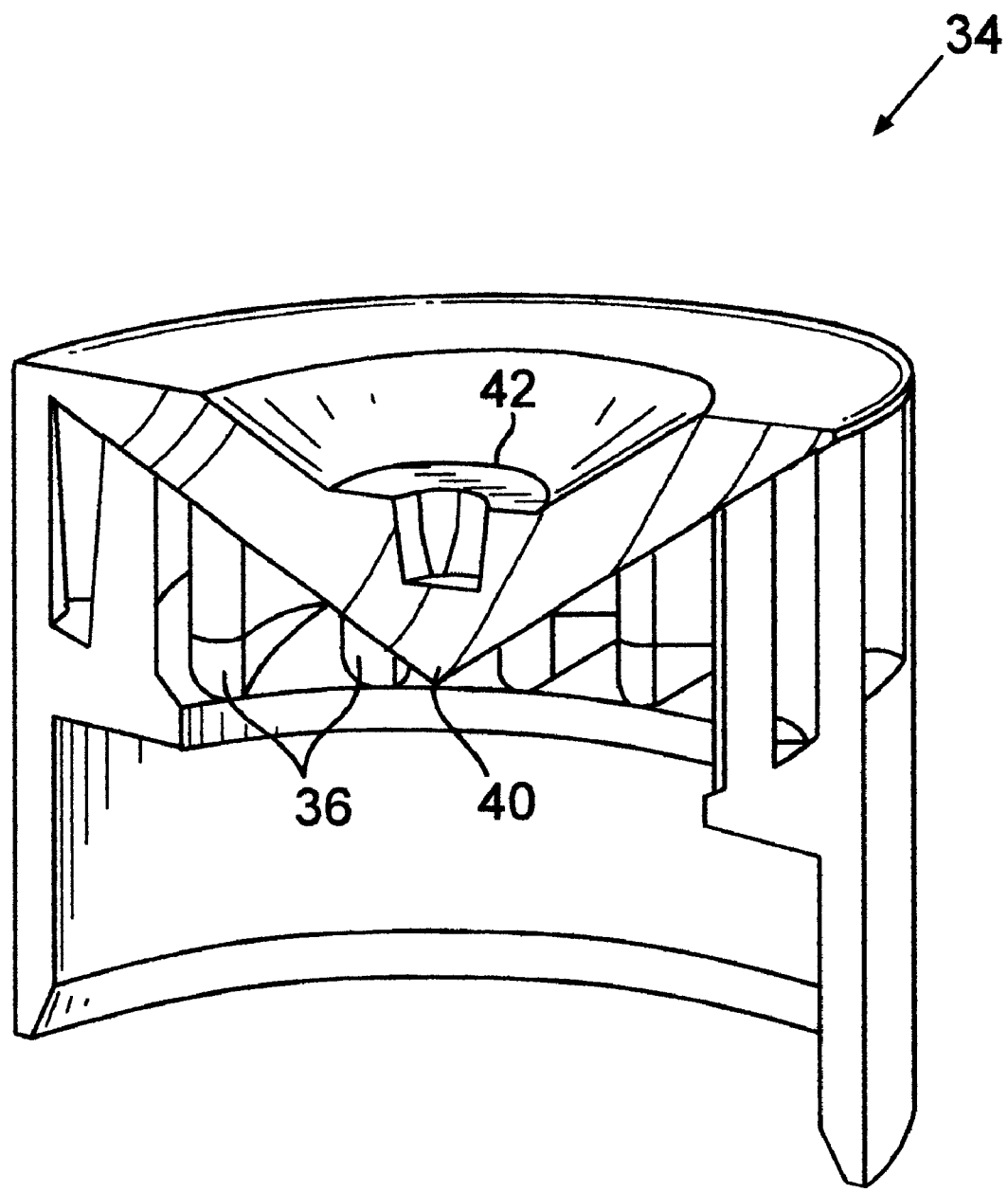
FIG. 6 shows a sectional view of a stator of the apparatus of FIG. 1.
Figure 7:
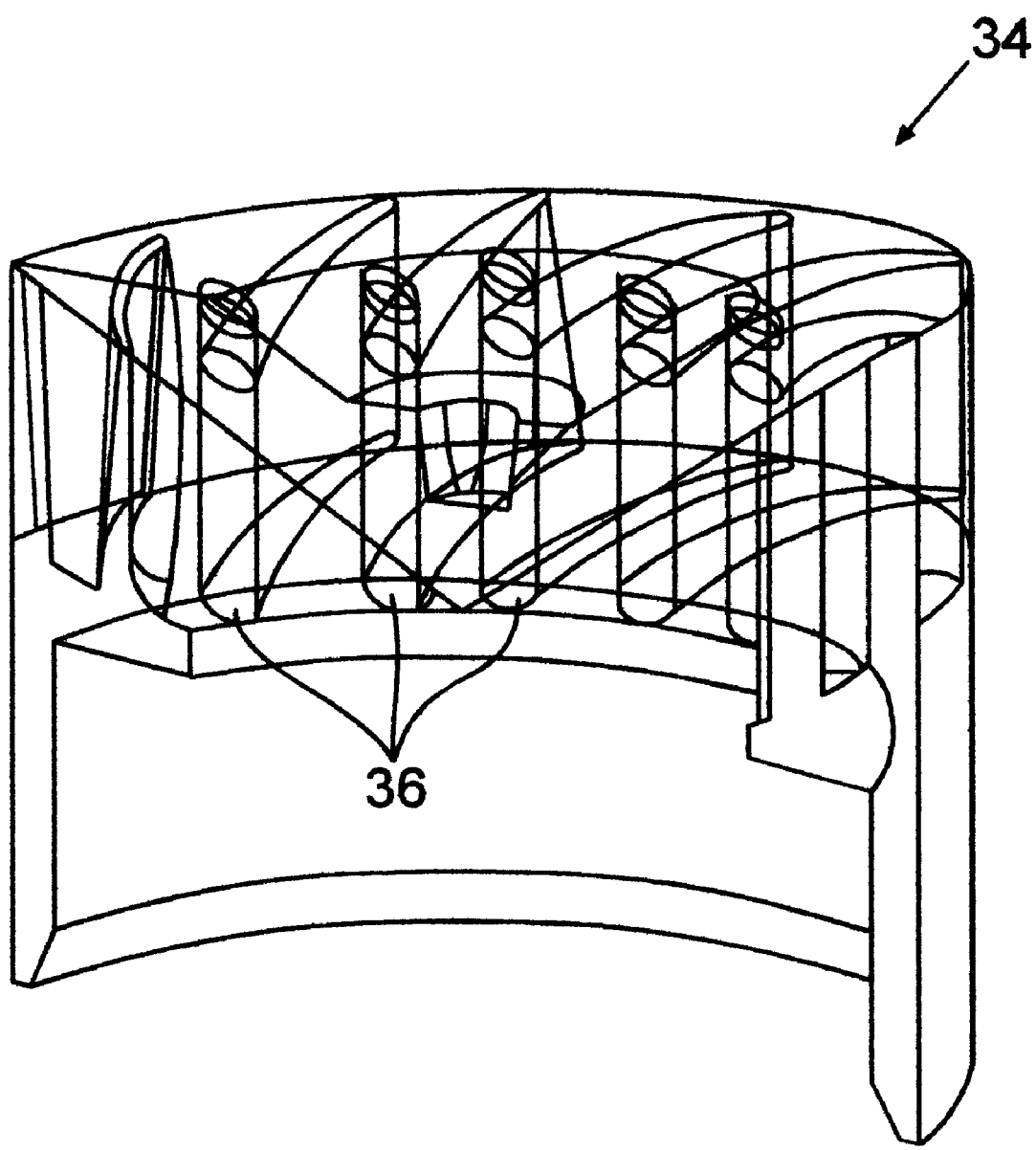
FIG. 7 shows a three dimensional view of a rotor of the apparatus of FIG. 1.
Figure 8:
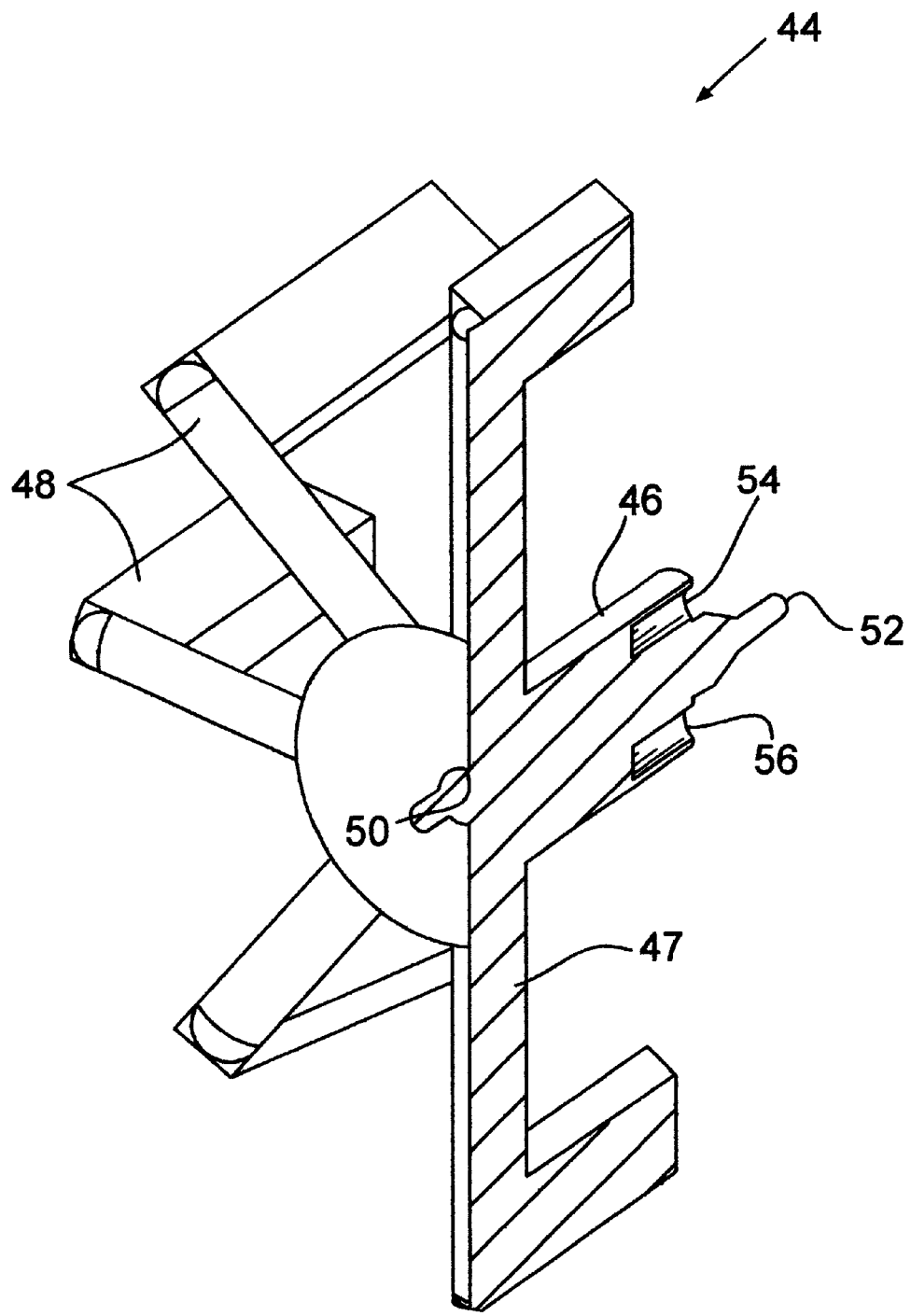
FIG. 8 shows an axial sectional elevation of the rotor of FIG. 7.

As can best be seen in FIGS. 5, 6 and 7 of the drawings, the stator 34 is configured to act as a filter. The stator 34 has a plurality of circumferentially spaced helically extending vanes 36 extending outwardly from the centre region of the stator 34 with the gap width between adjacent vanes 36 being selected to inhibit the passage of undesirable particles through the stator 34. A series of closure member engaging formations 40 protrude from the stator 34 axially in one direction and a rotor support formation 42 protrudes axially from the stator 34 in the opposite direction.

The apparatus 16 includes a rotor 44 rotatably mounted in the first chamber 32 immediately downstream of the stator 34. The rotor 44 includes a hub 46 from which a plurality of circumferentially spaced radially extending arms 47, and from the arms 47, axially extending vanes 48 protrude. A lower bearing pin 50 protrudes axially from the hub 46 and is supported on the rotor support formation 42. An upper bearing pin 52 protrudes axially from the hub 46 in a direction opposite to the direction of the lower bearing pin 50 and is supported in a complementary bearing 53 provided in the intermediate part 28 of the housing 18. In order to minimise balance and strength problems, the rotor 44 is made from HDPE, which has density similar to that of water.

In an embodiment (not shown) the hub 46 is hollow and generally frusto-conical in shape tapering in a downstream direction, i.e. away from the stator 34.

A magnet 54 is mounted on that surface of the hub 46 from which the upper bearing pin 52 protrudes. Further, a counter balance weight 56 is provided in the surface of the hub 46 at a position diametrically opposed to the opposed to the position of the magnet 54 to ensure that the hub 46 is rotationally balanced. A sensor in the form of a reed switch 58 is mounted on the intermediate part 28 of the housing 18 to sense the passage of the magnet 54 and thereby count the rotations of the rotor 44. The reed switch 58 is connected to a processor (not shown).

The outlet port 22 is circular cylindrical in shape and defines at its inner end a valve seat 60. The outlet port 22 is connected in flow communication with the first chamber 32 by a generally peanut-shaped connecting chamber 62.

The apparatus 16 includes valve means, generally indicated by reference numeral 64. The valve means 64 includes a diaphragm 66 mounted in the connecting chamber 62 and configured to seat sealingly against the valve seat 60. The diaphragm 66 and intermediate part 28 of the housing 18 define between them a vent chamber 68. A vent line 70 leads from the vent chamber 68 into the outlet port 22 at a position downstream of the valve seat 60. A bleed opening 72 which is of substantially smaller cross-section than the vent line 70 extends through the diaphragm 66. A pin 74 is mounted on the intermediate part 28 in register with the bleed opening 72 so as to remove any blockages from the bleed opening 72 as the diaphragm 66 moves as described in more detail hereinbelow.

The vent line 70 comprises an upstream portion which leads into an intermediate chamber 78 and a downstream portion 80 which leads from the intermediate chamber 78 into the outlet port 22. The upstream end of the downstream portion 80 of the vent line 70 defines a valve seat 82. The diaphragm 66 extends into the intermediate chamber 78 and is displaceable by means of a solenoid 84 into a closed position in which it seats sealingly against the valve seat 82 thereby inhibiting flow through the vent line 70.

The solenoid 84 is sealed into the housing 18 by means of a diaphragm 66 portion 64.1 and includes a core 86 which comprises two pieces 86.1, 86.2 between which is located a shaft in the form of a plastic nail 89 which is attached to the diaphragm portion 64.1 at one end. A magnet 87 is provided on the nail 89 and a ferritic washer 91 further down the nail 89 completes the magnetic circuit required to operate the solenoid 84. The diaphragm portion 64.1 acts as a spring and biases the nail 89 into its natural position in which the diaphragm portion 64.1 is not deformed and into a position in which the diaphragm 66 is urged into abutment with the valve seat 82.

Flow detection means, generally indicated by reference numeral 90, is provided to sense flow through the channel 70. A magnet 94 is mounted on a flow detection portion 64.2 of the diaphragm 66. When flow takes place through the vent line 70 before valve 64 has opened, pressure drops in the chamber 68 and lifts diaphragm portion 64.2. The magnet 94 is thus lifted towards the ferritic reed switch 93, which is activated by the proximity of said magnet 94.

In another embodiment (not shown), the flow detection means includes a fixed magnet and a floating magnet mounted in the vent line 70 and configured so as to repel one another. Once again, a reed switch is mounted in the intermediate part 18 adjacent to the rest position of the floating magnet so that flow urges the floating magnet towards the fixed magnet against the forces of magnetic repulsion thereby activating the reed switch which in turn is connected to the processor.

From the above description, it will be appreciated hat the flow path is defined in and between the lower part 26 and intermediate part 28 of the housing 18 and a suitable seal 102 is provided therebetween. The seal 102 includes all the diaphragms required for the operation of the device 10 and is moulded from a suitable material, here nitrile rubber, of varying thickness as required for the various stiffnesses of the various diaphragm portions 64.1, 64.2, 66 and sealing portions. The diaphragm 64.2 nitrile rubber thickness is 0.3 mm, thereby making it sensitive to small pressure variations.

The top part 30 is mounted on the lower and intermediate parts 26, 28 and defines a chamber 104 within which the processor (not shown) and a power supply in the form of a battery (not shown) are housed.

Figure 1:
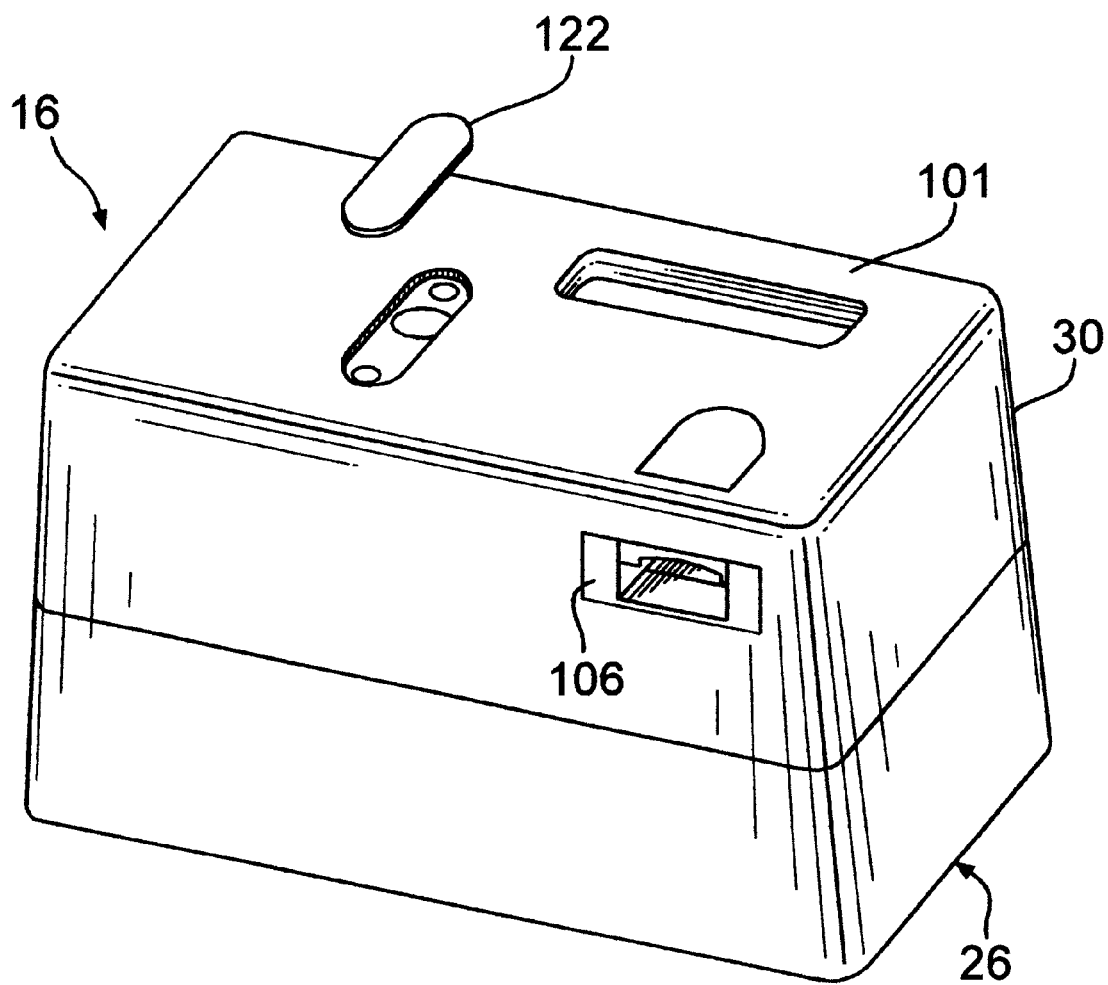
FIG. 1 shows a three-dimensional view of a liquid dispensing apparatus in accordance with the invention.

As can best be seen in FIG. 1 of the drawings, a tag reader 106 and an electronic display panel 107 are provided on a surface of the top part 30. A switch (not shown) which is configured to connect the processor to a power source can be positioned adjacent to the tag reader 106 and can be activated by means of a magnet mounted on a handle of a tag when the tag is positioned in abutment with the tag reader 106 thereby connecting the processor to the power supply.

As can best be seen in FIGS. 2 and 3 of the drawings, the inlet pipe 12 and outlet pipe 14 extend partway through a wall 108 and terminate in male formations 110 which are slidingly and sealingly receivable in the inlet port 20 and outlet port 22. Each formation 110 is provided with an annular seal 112 to ensure a fluid tight seal between the male formations 110 and the inlet and outlet ports 20, 22. In order to ensure that the spacing between the male formations 110 corresponds to the spacing between the inlet and outlet ports 20, 22, use is made of an apertured spacer plate 114 through which the male formations 110 extend parallel to one another. A pair of spaced apart screw-threaded holes 116 is provided in the plate 114 and the apparatus 116 is secured in position by means of a pair of Allen cap screws 118 which extend through holes in the housing into screw-threaded engagement with the holes 116. A tamper indicating cap or plug 122 is provided over the holes through the housing so as to inhibit access to the screws 118 and to serve as an indicator if an attempt has been made to tamper with the screw 118.

In an embodiment not shown, a non-return valve is provided in the inlet pipe 12. The non-return valve comprises a poppet or closure member which is urged resiliently to its closed position by means of a coil spring. The closure member engaging formation 40 fast with the stator 34 is configured such that when the male formations 110 are received in the inlet and outlet ports 20, 22 it abuts against the closure member thereby displacing it away from its closed position and permitting the flow of liquid through the inlet pipe 12. Further, a filter 130 is mounted in a removable portion of the inlet pipe upstream of the non-return valve, however it can be mounted anywhere in the inlet pipe 12.

In use, in order to have water dispensed from the installation 10 a purchaser will purchase, from an authority, e.g. a municipality, a token, e.g. in the form of a Dallas tag, encoded with a predetermined amount of credit. When the purchaser reaches his home he inserts the tag into the slot housing the tag reader 106 and the magnet positioned in the handle of the tag activates the switch which energises the processor. The processor then reads and stores in its memory the credit contained on the tag and adds the credit to any existing credit. In addition, the credit on the tag is cleared. The tag also acts as an actuating handle to operate the valve manually to a closed position for a yard meter installation, or to an open position for a stand pipe installation. In FIG. 3, 106 indicates the card reader slot displaceably mounted on a pair of coil springs 106.1. Further, a shaft 106.2 is connected to the card reader slot 106, such that when the tag is inserted and the card reader slot 106 is urged downwards against the bias of the coil springs 106.1, the shaft 106.2 presses on a portion of diaphragm portion 64.3 to inhibit the flow of fluid through the vent line 70, thereby preventing flow of fluid through the flow path 24 between inlet port 20 and outlet port 22, thereby acting as a manual secondary valve means.

When there is no flow through the outlet port 22, i.e. when a tap downstream of the outlet port is closed the pressure acting on the diaphragm 66 urges it against the valve seat 60. When the tap is opened there will be an immediate pressure drop in the vent line 70 and hence in the vent chamber 68 thereby permitting the diaphragm 66 to be displaced away from the valve seat 60 and permitting water to flows from the first chamber 32 into the outlet port 22. As the water flows through the stator 34 it is deflected helically as it exits the stator 34 the helical flow of the water causes the rotor 44 to rotate. It will be appreciated that the water passing through the rotor 44 will apply an axial drag to the vanes 48 thereby tending to lift the rotor 34 or displace it away from the inlet port 20. A conical section 45, configured to match the rotor 44, is fitted over the rotor 44. The conical section 45 serves to limit short circuiting of fluid from the stator 34 directly to the chamber 62 without registering a reading on the meter or causing lateral forces on the rotor 44.

In an embodiment not shown, the drag is offset by the taper of the hub 46 which effectively increases the cross-sectional area through which the water can flow thereby decreasing the velocity and increasing the pressure of the water which tends to urge the rotor 44 in a direction opposite to the direction of the force exerted by the drag on the vanes 48.

As the rotor 34 rotates, the reed switch 58 senses the passage of the magnet and the processor registers the number of rotations of the rotor 44 and hence the rate of flow of the water which is communicated to the processor. It is to be appreciated that the water existing the rotor 44 will still have a swirling action and a baffle plate (not shown) may be provided to guide the water into the outlet port 22. When the tap downstream of the outlet port 30 is closed pressure builds up in the outlet port 22 which prevents flow through the vent line 70. As a result pressure acting on the diaphragm 66 causes the diaphragm 66 to be displaced into abutment with the valve seat 60.

It will be appreciated that for all this time the core 86 of the solenoid 84 has been in its retracted position so that the diaphragm 66 has been clear of the valve seat 82.

When there is no flow of water the processor enters a slumber mode thereby conserving power. When the tap is once again opened there will be flow through the vent line 70 which causes the magnet 94 to be displaced and permit the flow detection means 90 to detect flow which will alert the processor which will then record the volume of water dispensed by means of the rotor 44 in the manner described above and will update the user's credit accordingly.

It will be appreciated that the inertia of the rotor 44 will be very low and that little flow will be required in order to rotate the rotor 44. However, it may be possible that with flow rates below the minimum rated flow rate the rotor 44 will not rotate. In this case, the flow detection means 90 will detect the flow in the manner described above thereby activating the processor. If the processor does not receive a signal from the reed switch 58 within a predetermined period of time, e.g. three seconds, indicating the rate of flow then the processor will operate the solenoid 84 so that the moveable piece 86.2 of the core 86 is displaced to its protruding or extended position (shown in FIG. 3 of the drawings) in which it urges the diaphragm 66 against the valve seat 82 thereby preventing flow through the vent 70. This results in a pressure build-up in the vent chamber 68 which urges the diaphragm 66 against the valve seat 60 thereby interrupting the flow of water. It will then be necessary for a user to reset the installation, e.g. by positioning his tag in abutment with the tag reader 106 which will cause the processor to activate the solenoid to retract the moveable piece 86.2 of the core 86. Once in its retracted position the moveable piece 86.2 is retained in its retracted position against the bias of the diaphragm portion 64.1 by residual magnetism. Naturally, should the flow detection means 90 once again detect a flow rate below a predetermined minimum level which is indicative of a leak or that the flow meter comprising the rotor 44 and reed switch 58 is not operating the solenoid will once again be energised to interrupt the flow of water in the manner described above.

It is to be appreciated that in order to displace the piece 86.2 it is necessary only to assist the diaphragm 64.1 in overcoming the force of the residual magnetism which requires very little electrical energy.

Typically flow rates below the rated flow rates would be symptomatic of a leak. Hence, by making use of the flow detection means 90 leakages may be detected and be shut off.

As mentioned above, when there is no flow through the outlet port and hence through the vent line 70, the diaphragm 66 is urged against the valve seat 60. However, when there is flow through the vent line 70, the diaphragm 66 is permitted to be displaced upwardly away from the valve seat 60. Accordingly, instead of making use of the magnets 92, 94, the flow detection means 90 may include a magnet (not shown) mounted on a pin 150 which is fast with the diaphragm 66 for displacement therewith. The pin rides in a complementary recess 152 in the intermediate part 28 of the housing 18. The magnet is mounted on that end of the pin 150 remote from the diaphragm 66.

Hence, when there is flow through the vent line 70, the diaphragm 66 is displaced upwardly away from the valve seat 60 and the magnet mounted on the pin 150 activates the reed switch 98 which in turn activates the processor, in the manner described above, to indicate that there is flow through the vent line 70. If, within a predetermined period of time, the processor does not receive a signal from the reed switch 58 then the valve means is closed to interrupt the flow of water and thereby restrict losses due to leakage in the manner described above.

Further, should the user's credit which is stored on the processor fall below a predetermined level, the processor will activate a waning system to alert the user to the act this his credit is low. The warning system may include a buzzer, instead, or in addition, the processor may be configured periodically to activate the solenoid thereby causing the valve means 64 to open and close which in turn results in a pulsing of the water flow to provide a visual and/or audible indicator to the user that the credit is low. This indication is particularly valuable where the meter is located remote from the dispensing point. The remaining credit can be displayed on the display panel 107. Further, if the tag is held against the tag reader for a predetermined period of time the total volume of water which has passed through the apparatus is displayed.

If the user's credit falls below a predetermined minimum the solenoid is operated to close the valve in the manner described above. The valve will then remain in this position until the credit is increased by engaging a credit containing tag in the reader 106.

The installation will typically include a remote access point 134 (FIG. 2) positioned for example on an outer surface of a wall of a house in order that access can be gained thereto by a water bailiff and that data stored on the processor can be downloaded simply by pressing a sensor against the access point 134.

Should a user attempt to tamper with the installation the plugs 122 will provide a visual indication that tampering or attempted tampering has taken place. In addition, should the user succeed in removing the screws 118 as the apparatus 16 is removed the closure member (not shown) will be urged to its closed position thereby preventing the flow of water through the inlet pipe and minimising losses in this manner.

To achieve lower power consumption, the valve means 64 is not switched while sufficient credit remains or no leakage is detected, i.e. it is left in the "latched open" position. Also, the processor is only activated when flow is detected. If desired a lower power consumption counter can be used for counting the pulses and hence revolutions of the rotor 44. During this counting the processor is kept in the slumber mode to conserve energy. Only when the counter buffer is full is the processor brought into operation and the information contained in the counter buffer is transferred to the processor.

When the battery does eventually run low a warning is placed on the tag to inform the authorities that the battery is low and that the apparatus 16 must be replaced. The unit is replaced by breaking the seal 122 covering the heads of the screws 118 and removing the screws. As mentioned above, when the apparatus 16 is removed the closure member 126 returns to its closed position thereby shutting off the flow of water through the inlet pipe 12.

The liquid dispensing apparatus units are factory sealed by seals 17 and must be returned to the factory to have the battery replaced and to be recalibrated.

The centres of the seal 122 are of a thin material. This allows the centres to be punched out when inserting an Allen key or similar tool to unscrew the screws 118. When the screws are undone, the remainder of the seals 122 are popped out by knocking the shank of the screw so that the head abuts the remaining sections of the seals 122 and dislodges them from the housing 18. Fresh seals can then be inserted when the apparatus is re-installed.

The housing 18 is designed to be approximately the same size as a conventional building brick which permits it to be readily mounted in a wall.

The Inventor believes that an installation in accordance with the invention will provide a cost effective and accurate method and installation for monitoring the consumption of water. In addition, by virtue of the extremely low power requirements of the installation, the Inventor believes that a conventional battery will have an extended life, typically of the order of five years. In addition, by virtue of its modular "plug-in" construction, the Inventor believes that the apparatus 16 will be relatively easy to install and replace thereby saving time and improving productivity.

Further, the Inventor believes that by virtue of the integrated construction of the apparatus. i.e. the fact that the housing comprises three moulded parts which, when assembled, define the flow path, the inlet and outlet ports and the valve seats 60 and 82 and the fact that the meter, flow control valve, latching valve, filter, tag reader processor, read out and battery are part of or mounted in or on the housing, results in the apparatus being producible at a relatively low cost. In addition, the configuration of the flow path and the various components of the apparatus have been designed for low flow resistance thereby to minimise hydraulic losses which the Inventor believes will permit the apparatus to be particularly accurate in monitoring the volume of liquid dispensed.

What is claimed is:

1. A liquid dispensing apparatus for dispensing a liquid, said apparatus comprising:

a flow meter having flow rate detection means;

a latching solenoid valve operative with the flow meter for metering the liquid being dispensed;

a leakage detection means for detecting liquid leaking from the liquid dispensing apparatus, the leakage detection means including a diaphragm located radially to a direction of flow of liquid through the liquid dispensing apparatus, a magnet provided on the diaphragm and displaceable by the diaphragm in sympathy with fluctuations in pressure exerted on the diaphragm, and a detection switch actuatable by proximity to the magnet located on the liquid dispensing apparatus for detecting displacement of the magnet towards the detection switch;

processing means for comparing signals from said flow rate detection means and said leakage detection means; and control means for interrupting the flow of liquid, wherein said control means interrupts the flow of liquid when (1) said leakage detection means detects a flow of liquid, and (2) said flow rate detection means does not indicate at least a minimum predetermined flow rate.

2. A liquid dispensing apparatus as claimed in claim 1, wherein the detection switch of the leakage detection means is a reed switch of the type having a magnetic reed of opposite polarity to the magnet provided on the diaphragm, the switch being actuatable by the magnetic repulsion of the magnetic reed as the magnet provided on the diaphragm is displaced towards it.

3. A liquid dispensing apparatus as claimed in claim 2, wherein the diaphragm is made of a material having a shore hardness on the Shore A hardness scale of about 60.

4. A liquid dispensing apparatus as claimed in claim 1, wherein the material of manufacture of the diaphragm is selected to have a hardness on the Shore A hardness scale of between 50 and 70.

5. A liquid dispensing apparatus as claimed in claim 4, wherein the diaphragm is made from a material selected from the group consisting of synthetic butyl rubber, natural rubber, polyethylene, nitrile rubber, and Neoprene™.

6. A liquid dispensing apparatus claimed in claim 5, wherein the diaphragm is made of nitrile rubber.

7. A liquid dispensing apparatus as claimed in claim 1, wherein the flow meter includes:

a stator mounted in the flow path and configured to impart an angular direction of flow to liquid passing therethrough, a rotor mounted for rotation in the flow path immediately downstream of the stator, the rotor including a hub and a plurality of circumferentially spaced apart radially extending arms and axially extending vanes protruding from said arms.

8. A liquid dispensing apparatus as claimed in claim 7, wherein the rotor is made from a material having a density similar to that of the fluid, the flow of which is to be measured with the use of the meter.

9. A liquid dispensing apparatus as claimed in claim 8, which includes a magnet mounted on the rotor and a counter configured to count magnetic pulses which correspond to the revolutions of the rotor and hence the liquid flow rate.

10. A liquid dispensing apparatus as claimed in claim 9, wherein the magnet and counter are in the form of a magnet and ferritic reed switch arrangement, the magnet being mounted on the rotor and the counter is a reed switch actuatable by the magnet provided on the rotor is displaced towards and passes in proximity of the reed during rotation of the rotor.

11. A liquid dispensing apparatus as claimed in claim 9, wherein a counter balance weight to the weight of the magnet is provided on the rotor to ensure rotational balance of the rotor.

12. A liquid dispensing apparatus as claimed in claim 7, wherein the rotor is made from H.D.P.E.

* * * * *